E. W. COUCHOIS.
SHIP'S NAVIGATING APPARATUS.
APPLICATION FILED DEC. 29, 1916.

1,280,406.

Patented Oct. 1, 1918.
7 SHEETS—SHEET 1.

Witness
Frederick L. Fre
John J. McCarthy

Inventor
Edward W. Couchois.
By Victor J. Evans,
Attorney

E. W. COUCHOIS.
SHIP'S NAVIGATING APPARATUS.
APPLICATION FILED DEC. 29, 1916.

1,280,406.

Patented Oct. 1, 1918.
7 SHEETS—SHEET 3.

Witness
Frederick L. Fox,
John J. McCarthy

Inventor
Edward W. Couchois.
By Victor J. Evans.
Attorney

E. W. COUCHOIS.
SHIP'S NAVIGATING APPARATUS.
APPLICATION FILED DEC. 29, 1916.

1,280,406.

Patented Oct. 1, 1918.
7 SHEETS—SHEET 4.

E. W. COUCHOIS.
SHIP'S NAVIGATING APPARATUS.
APPLICATION FILED DEC. 29, 1916.

1,280,406.

Patented Oct. 1, 1918
7 SHEETS—SHEET 6.

Inventor
Edward W. Couchois.

Witness
Frederick L. Fox,
John J. McCarthy

By Victor J. Evans.
Attorney

UNITED STATES PATENT OFFICE.

EDWARD W. COUCHOIS, OF MACKINAC ISLAND, MICHIGAN.

SHIP'S NAVIGATING APPARATUS.

1,280,406.  Specification of Letters Patent.  Patented Oct. 1, 1918.

Application filed December 29, 1916. Serial No. 139,645.

*To all whom it may concern:*

Be it known that I, EDWARD W. COUCHOIS, a citizen of the United States, residing at Mackinac Island, in the county of Mackinac and State of Michigan, have invented new and useful Improvements in Ships' Navigating Apparatus, of which the following is a specification.

This invention relates to improvements in ships' navigating apparatus, and has particular application to compass controlled apparatus.

In carrying out the present invention, it is my purpose to provide ships' navigating apparatus, whereby the distance traveled by the ship and the course of the ship will be recorded and which will be under the control of the compass and operate accurately and with reliability under all conditions.

With the above and other objects in view, the invention consists in the construction, combination, and arrangement of parts hereinafter set forth and falling within the scope of the claims.

In the practice of my invention, I employ a turn table that carries a chart having the meridian lines and other data necessary to navigation inscribed thereon. This turn table normally lies in a position corresponding to the needle of a compass, and is connected to a reversible motor under the control of the compass needle, so that upon the turning of the ship in one direction or the other, the turn table will be operated to maintain its position with respect to the compass needle. Coöperating with the chart on the turn table is a scribing mechanism that is under the control of the compass needle and traces a line upon the chart table corresponding to the direction of travel of the ship. This scribing mechanism travels across the chart table in the movement of the ship, and is driven by a propeller submerged in the water and connected to the scribing mechanism through suitable reduction gearing so that the travel of the chart table will be proportionate to the distance traveled by the ship, thereby enabling the distance covered by the ship to be accurately determined. The mechanism controlling the scribing apparatus from the compass needle acts to lock the scriber against movement over the chart table when the ship turns in one direction or the other, and automatically releases the scriber as soon as the vessel has been turned, thereby enabling the scriber to trace a new line on the chart table corresponding to the course of the vessel.

In the accompanying drawing:—

Referring now to the drawings in detail, 1—1 designate uprights suitably fastened to the deck of the vessel and spaced apart. Passed through the upper ends of the uprights 1—1 are horizontally alining trunnions 2—2, respectively. Gimbaled upon the trunnions 2 is a horizontally disposed rectangular frame 3 and secured to opposite bars of the frame 3 are trunnions 4, alining with each other horizontally, and arranged in a plane intersecting the plane of the trunnions 2 at right angles thereto. Mounted within the frame 3 and gimbaled upon the trunnions 4 is a horizontally disposed restangular frame 5. Depending from the inner frame 5 are arms 6 spaced apart equal distances and having the lower ends inturned and connected with a horizontally disposed ring 7. The upper edge of the ring 7 is formed with an inwardly projecting flange 8 that constitutes an annular track, and depending from the ring 7 are arms 9 spaced apart equal distances and converging toward one another at their lower extremities and having the lower ends thereof connected with a relatively small ring 10. Connected with the arms 9 below the ring 7 and projecting toward the axis of the ring are horizontal bars 11 and the inner ends of the bars 11 are connected with a small ring 12 arranged below the ring 7 and coaxial with the rings 7 and 10. Connected with the arms 6 and spaced apart from the frame 5 below the latter is a frame 13.

By means of the frames 3 and 5 and the connections between the outer frame and the uprights 1 and between the inner frame and the outer frame, it will be seen that the rings suspended from the inner frame will be at all times maintained in a horizontal position irrespective of the rolling of the ship.

Mounted in the ring 10 and suitably secured therein is a compass 14, either of the spirit gyro-repeater or oil type. Integral with the crystal of the compass 14 and uprising therefrom is a vertical glass tube 15 arranged coincident with the axis of the magnetic needle of the compass and in open communication with the interior of the compass structure so that the fluid in the compass structure may rise in the tube 15, to seal the compass. Mounted in the ring 12 and appropriately fastened therein is an electric motor 16 provided with a hollow armature shaft 17 arranged vertically. Arranged above the ring 7 is a turn table 18 and journaled in the under side of the turn table 18 adjacent to the periphery thereof are rollers 19 that bear upon the circular track formed by the flange 8, so that the turn table 18 will be supported upon the ring 7 and enabled to revolve around the ring. Fastened to the under side of the turn table 18 concentrically of the axis thereof is a spur gear 20 that is connected through suitable reduction gearing 21 mounted upon a stub shaft carried by one of the bars 11 with a pinion 22 keyed upon the upper end of the shaft 17 of the motor 16. Extending through the hollow armature shaft 17 and loosely disposed therein is a vertical shaft 23 having the upper end fixed to the turn table 18 and the lower end terminating above the tube 15 and in axial alinement therewith, and arranged concentrically of the shaft 23 below the motor 16 and fixed to such shaft is a disk 24 of insulating material having the upper surface formed with a plurality of concentrically disposed grooves or channels 25 adapted to contain mercury or other liquid capable of conducting an electric current. Also surrounding the shaft 23 concentrically thereof and fixed thereto is a circular plate 26 formed of insulating material, and arranged below the disk 24. The disk 24 and the plate 26 are preferably connected together by means of vertical posts 27 having the upper ends fastened to the disk 24 and the lower ends secured to the plate 26. Mounted upon the upper surface of the plate 26 and arranged at opposite sides of the center of such plate are reversing switches A and B, each embodying a spider 28 formed with depending legs 29 secured to the plate. Slidably mounted in the spider 28 at the center thereof is a vertical rod 30, and mounted upon the lower end of the rod 30 is a substantially rectangular plate 31 of insulating material, while threaded onto the upper end of the rod 30 is a nut 32. Interposed between the nut 32 and the spider is a coiled expansion spring 33 acting to hold the rod and plate 31 normally elevated. Extending through each plate 31 longitudinally thereof are conductor bars 34 and 35 spaced apart in parallelism and having the outer ends thereof downturned as at 36. Formed in the upper surface of the plate 26 in line with the respective downturned ends 36 of the conductor bars are cuplike recesses 37 adapted to contain mercury or other liquid capable of conducting an electric current. Fastened to the lower side of each plate 31 at its center is an electromagnet 38, while seated in recesses formed in the plate 26 below the respective electromagnets 38 are electromagnets 39. When these electromagnets 38 and 39 are energized, the plates 31 are drawn downwardly against the action of the spring 33 and the downturned ends 36 of the conductor bars 34 and 35 engage in the respective mercury containing cups 37. Depending from the spider formed by the bars 11 are supporting arms 40 spaced apart equal distances around the ring 12 and having the lower ends terminating slightly above the disk 24 and secured in the lower ends of the supporting arms 40 is a disk 41 of insulating material arranged concentrically of the shaft 23 and free of the influence of such shaft. Extending through the disk 41 are contact fingers 42, 43, 44, 45, 46 and 47, engaging in the grooves or channels 25 respectively formed in the disk 24.

Suspended from the plate 26 is a block 48 of insulating material, and formed in the upper surface of the block 48 are channels 49 and 50, respectively, arranged end to end and describing a semi-circle, and formed in the block 48 between the outer ends of the channels 49, 50 is a relatively small semi-circular channel 51. This block 48 also rests upon a horizontal supporting member 52 that has the ends thereof secured to certain of the arms 9. Arranged within the tube 15 is a vertical stem 53 having the lower end fixed to the needle of the compass 14 at the axis of such needle and the upper end projecting above the tube 15 through the support 52 and the block 48 and terminating above the block 48. Mounted on the upper end of the stem 53 is a contact arm 54, and depending from the contact arm 54 at one end thereof is a contact roller 55 normally resting upon the block 48 between the channels 49, 50, and adapted to engage the mercury in either of said channels according to the movement of the block. Depending from the arm 54 adjacent to the other end thereof is a contact finger 56 that engages the mercury in the channel 51.

Extending across the frame 13 and suitably secured thereto are track rails 57 spaced apart in parallelism, and mounted upon these rails 57 are wheeled trucks 58, respectively, that are connected together for simultaneous movement along the rails by means of cross bars 59. These cross bars 59 and the trucks 58 constitute a carriage that is adapted to traverse the track rails 57 and move across the turn table 18. The cross bars 59 themselves also form track rails and mounted upon these rails is a carriage composed of wheeled trucks 60 that engage the respective rails formed by the cross bars 59. Connected to the trucks 60 adjacent to the respective ends of the carriage are the legs of U-shaped frames 61 that depend between the cross bars 59, and mounted upon the horizontal portions of the frames 61 is a plate 62. The frames 61 are of such depth that the plate 62 is disposed below the frame 13, and secured to the under side of the plate 62 is a scriber 63, while rising from the plate in line with the scriber is an upright 64. Slidably mounted in a bearing carried by the upright 64 and extending through the plate 62 is a rod or dog 65 having the lower end portion parallel with the scriber and formed with depending prongs 66, and the upper end equipped with an arm 67 that carries a depending electromagnet 68 arranged above a similar magnet 69 mounted upon the plate 62. Surrounding the dog 65 is a coiled expansion spring 70 that acts to hold the magnet 68 normally spaced apart from the magnet 69, and when these magnets are energized the magnet 68 is drawn into engagement with the magnet 69, thereby moving the dog downwardly against the action of the spring 70 to engage its prongs 66 with the turn table so that the carriage carrying the scriber will be locked to the turn table. Extending across the space between one of the trucks 60 and the upright 64 is a horizontal supporting bar 71, and upstanding from the bar 71 is a post 72. Pivoted between its ends upon the post 72 is a brake lever 73 having one end connected through the medium of a link 74 with the upper end of the dog 65 and the other end connected with a brake bar 75 spanning the space between the wheels on the adjacent truck 60 and having the outer ends thereof equipped with brake shoes 76 engageable with such wheels. The truck 60 equipped with the wheels under the control of the brake shoes is formed with an outwardly projecting lug 77 and interposed between such lug and the outer end of the lever 70 73 is a retractile spring 78 that acts upon the lever 73 to hold the brake shoes 76 normally in engagement with the wheels so that as long as the dog 65 is held in elevated position under the action of the spring 70, the brakes will be applied to the wheels and the small carriage held against movement on the large carriage.

Figure 10:
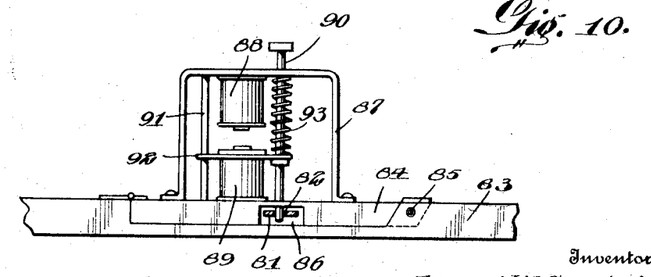
Fig. 10 is a fragmentary side elevation showing the controlling mechanism for one of the traveling carriages.
Figure 11:
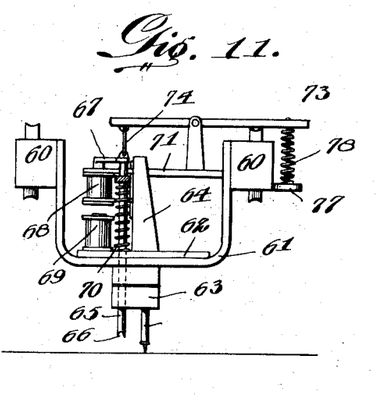
Fig. 11 is a similar view showing the mechanism for locking the scriber to the turn table.
Figure 12:
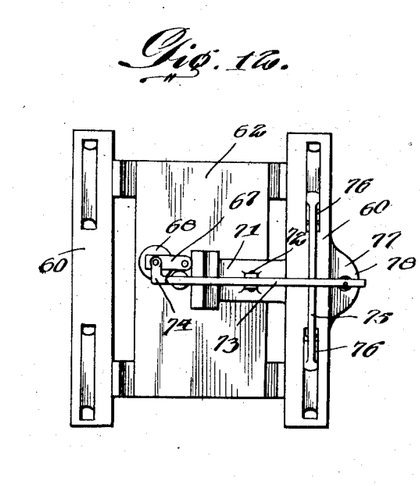
Fig. 12 is a top plan view of the same.
Figure 13:
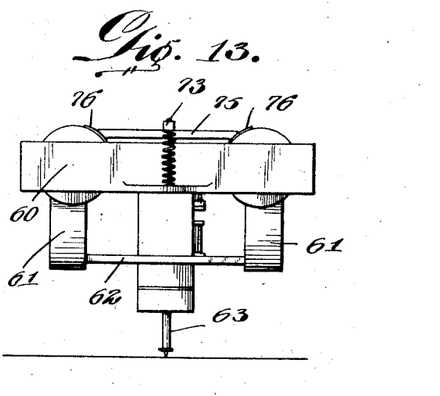
Fig. 13 is a view in elevation taken at right angles to Fig. 11.
Figure 14:
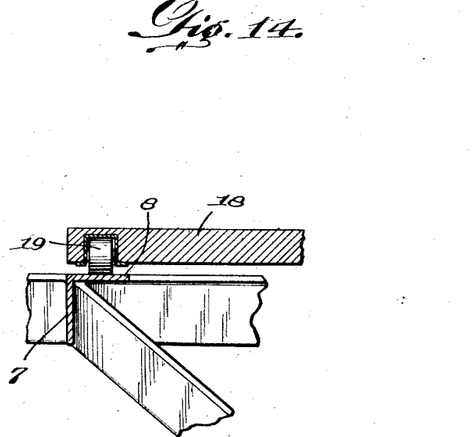
Fig. 14 is an enlarged fragmentary sectional view, showing the mounting for one end of the turn table.

The small carriage is normally held stationary on the large carriage and the large carriage is adapted to traverse the track rails 57 so as to move over the chart upon the turn table. In the present instance, the driving mechanism for the large carriage embodies shafts 79—79 arranged at opposite sides of the large carriage, and journaled in bearings carried by the frame 5. These shafts 79 are arranged in parallelism and fixed thereon are sprocket wheels 80, respectively, arranged at the center of the shafts. Trained over the sprocket wheels 80 is an endless belt in the form of a tape 81 perforated throughout its length as shown at 82. A bar 83 extends across the large carriage and has its ends downturned and secured to the trucks 58 of such carriage. This bar 83 it cut out centrally, as shown in Fig. 10 of the drawings, and arranged in the cut out portion is a block 84 having one end hinged to the bar and the other end connected to the bar by means of a pin 85 detachably mounted in alining openings in the bar and the block. The under surface of the strip 84 is formed with a transverse recess 86, and the lower run of the tape 81 extends through such recess. Mounted upon the block 84 and suitably secured thereto is an inverted U-shaped yoke 87 and secured to the top of the yoke 87 and depending therefrom is an electromagnet 88, while resting upon the block 84 below the magnet 88 is an electromagnet 89. Extending slidably through the top of the yoke 87 is a vertical latch rod 90 having the lower end projecting into the recess 86 and normally engaged in one of the perforations in the tape 81. Arranged at the side of the magnets 88 and 89 opposite from the latch 90 is a guide rod 91 and fixed to the magnet 89 is a strip 92 having one end slidably engaging the rod 91 and the other end fastened to the latch 90. Surrounding the latch 90 between the strip 92 and the top of the yoke 87 is a coiled expansion spring 93 acting to hold the latch 90 and the magnet 89 normally in lowered position so that the lower end of the latch 90 will engage the recess 86. Uprising from the frame 5 and disposed between the shaft 79 is a post 94. Arranged adjacent to one of the uprights 1 and fastened to such upright and offset outwardly therefrom is an upwardly extending bracket 95. Journaled in the post 94 and the bracket 95 is a horizontally disposed telescopic shaft 96 equipped at each end with a universal joint 97. Keyed upon the inner end of this shaft is a sprocket wheel 98 and trained over the sprocket wheel 98 and a sprocket wheel 99 fixed upon one of the shafts 79 is an endless chain 100 whereby motion may be transmitted from the shaft 96 to the shaft 79 in order to impart movement to the perforated tape 81. Fixed upon the other end of the shaft 96 is a worm wheel 101 and meshing with the worm wheel 101 is a worm 102 carried by the upper end of a vertical shaft 103 journaled in suitable bearings carried by the bracket 95 and the upright 1. Keyed upon the lower end of the shaft 103 is a beveled pinion 104 meshing with a similar pinion 105 keyed upon one end of a horizontal shaft 106. The outer end of this shaft 106 is connected through suitable mechanism with a propeller that is submerged in the water so that in the travel of the ship motion will be transmitted from the shaft 106 to the shaft 103 to operate the tape 81 whereby the carriages may be moved across the chart table.

Figure 15:
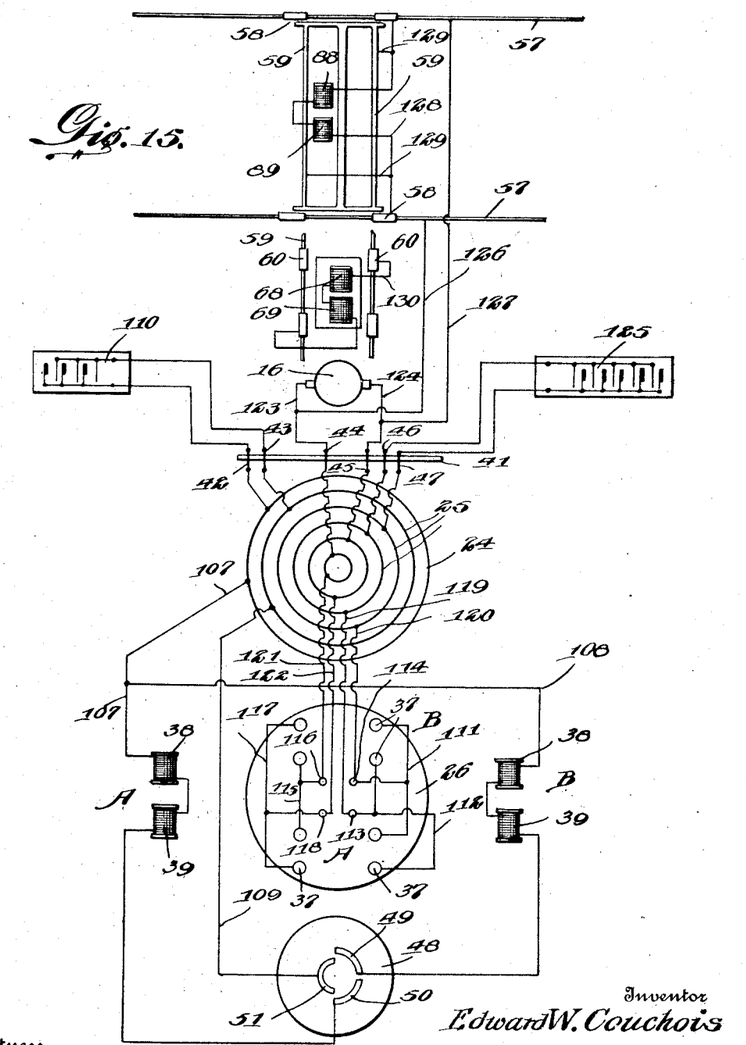
Fig. 15 is a diagrammatic view showing the circuit connections.

The circuit connections of the apparatus are illustrated in Fig. 15 of the drawings, and as here shown, the magnets 38 and 39 of the reversing switch A are connected in series in a conductor 107 that has one terminal connected to the outermost mercury channel 25 in the disk 24 and the other terminal connected to the mercury channel 50 in the block 48. The magnets 38 and 39 of the reversing switch B are connected in series in a conductor 108 that has one terminal connected to the mercury channel 49 in the block 48 and the other terminal tapped onto the conductor 107, between the reversing switch A and the disk 24. The other mercury channel 51 in the block 48 is connected with the next innermost mercury channel 25 in the disk 24 by means of a conductor 109. The fingers 42 and 43 carried by the disk 41 engage in these two channels and are connected with the respective terminals of a storage battery 110 or other suitable source of electrical energy. By means of this construction, it will be seen that when the block 48 is turned in one direction, the contact roller 55 will engage in the channel 49 thereby bridging such channel and the channel 51 owing to the contact finger 56 on the arm 54 being in engagement with the channel 51 at all times. In this position of the block 48 current flows from one side of the storage battery 110 through the finger 43, the corresponding channel 25 in the disk 24, the conductor 109, the channels 51 and 49, the conductor 108 and the magnets 38 and 39 of the reversing switch B and then back to the other side of the battery by way of the outermost channel in the disk 24 and the finger 42. Upon the energization of the magnets 38 and 39 the reversing switch B is operated and the plate 31 drawn downwardly to dispose the downturned ends 36 of the conductor bars in the corresponding mercury containing cups 37. On the other hand, when the block 48 is turned in the other direction, the contact roller 55 engages in the mercury channel 50, thereby bridging such channel and the channel 51 to energize the magnets 38 and 39 of the reversing switch A so that the plate 31 of this switch A will be drawn downwardly under the action of the magnets to dispose the downturned ends 36 of the conductor bars in the corresponding mercury containing cups 37. The outermost cup 37 at one end of the switch B is connected with the innermost cup of the switch A at the corresponding end of the last named switch by means of a wire 111, while the remaining cups at the said ends of the switches A and B are interconnected by means of a wire 112, and this wire 112 is connected with a binding post 113, while the wire 111 is connected with a binding post 114. The innermost cups at the other ends of the switches A and B are interconnected by means of a wire 115 that is connected with a binding post 116, while the outermost cups at the last named ends of the switches A and B are interconnected by means of a wire 117 that is connected with a binding post 118, and these binding posts 113, 114, 116, and 118 are arranged at the center of the disk 26. These binding posts are connected with the mercury channels that are engaged by the fingers 46, 47, 44 and 45, respectively, by means of conductors 119, 120, 121, and 122. The motor 16 is of the reversible type, as previously stated, and the terminals thereof are connected to the fingers 44 and 45, respectively, by means of conductors 123 and 124, while the fingers 46 and 47 are connected with the respective terminals of a storage battery 125 or other suitable source of electrical energy.

As illustrated at the top of Fig. 15, the track rails 57 that support the large carriage are connected across the conductors 123 and 124 by means of conductors 126 and 127, while the magnets 88 and 89 are connected in series with each other in a conductor 128 that has the terminals thereof connected to the trucks 58 respectively of the large carriage. This conductor 128 is also tapped onto the respective track forming cross bars 59 of the large carriage adjacent to the respective terminals of said conductor 128 by means of branch wires 129. The magnets 68 and 69 on the small carriage that is mounted on the large carriage are connected in series with each other in a conductor 130 and the terminals of this conductor 130 are connected to the respective trucks 60 of the small carriage so that when current is fed to the magnets 88 and 89 of the large carriage current will also flow through the track forming cross bars 59 to the trucks 60 of the small carriage and the magnets 68 and 69 of the small carriage thereby energizing the electromagnets on both carriages simultaneously.

Figure 1:
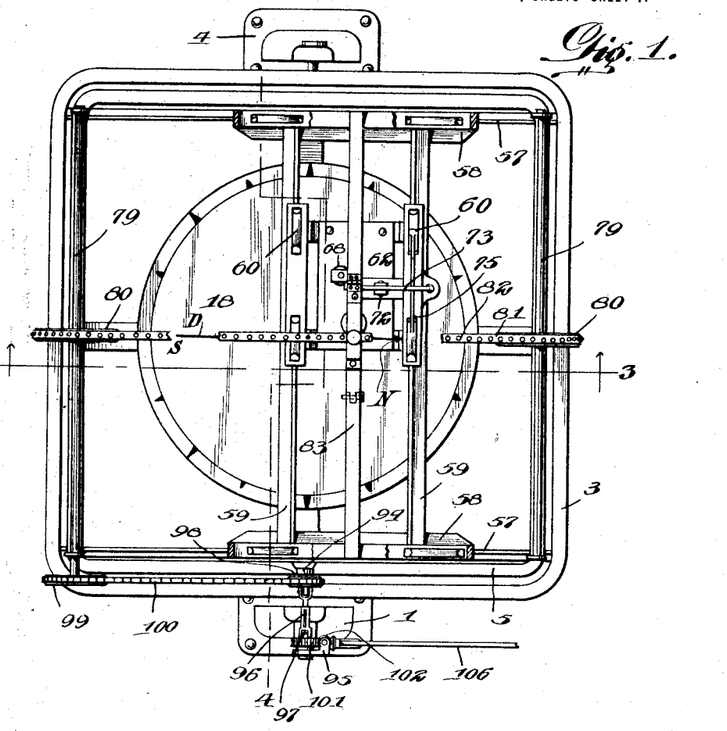
Figure 1 is a top plan view of ships' navigating apparatus constructed in accordance with the present invention.
Figure 2:
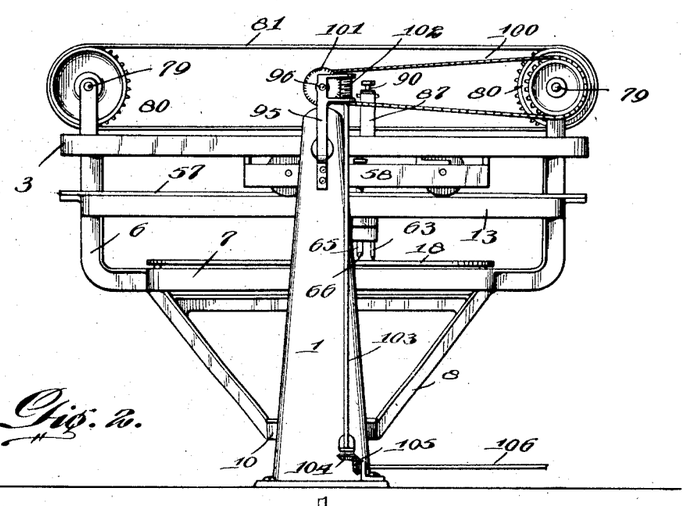
Fig. 2 is a side elevation of the same.
Figure 3:
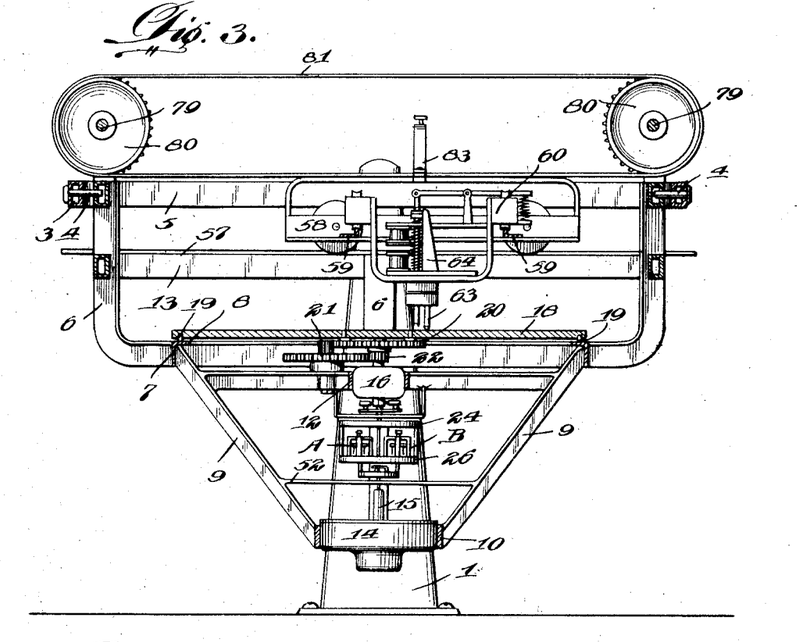
Fig. 3 is a sectional view on the line 3—3 of Fig. 1.
Figures 4, 7:
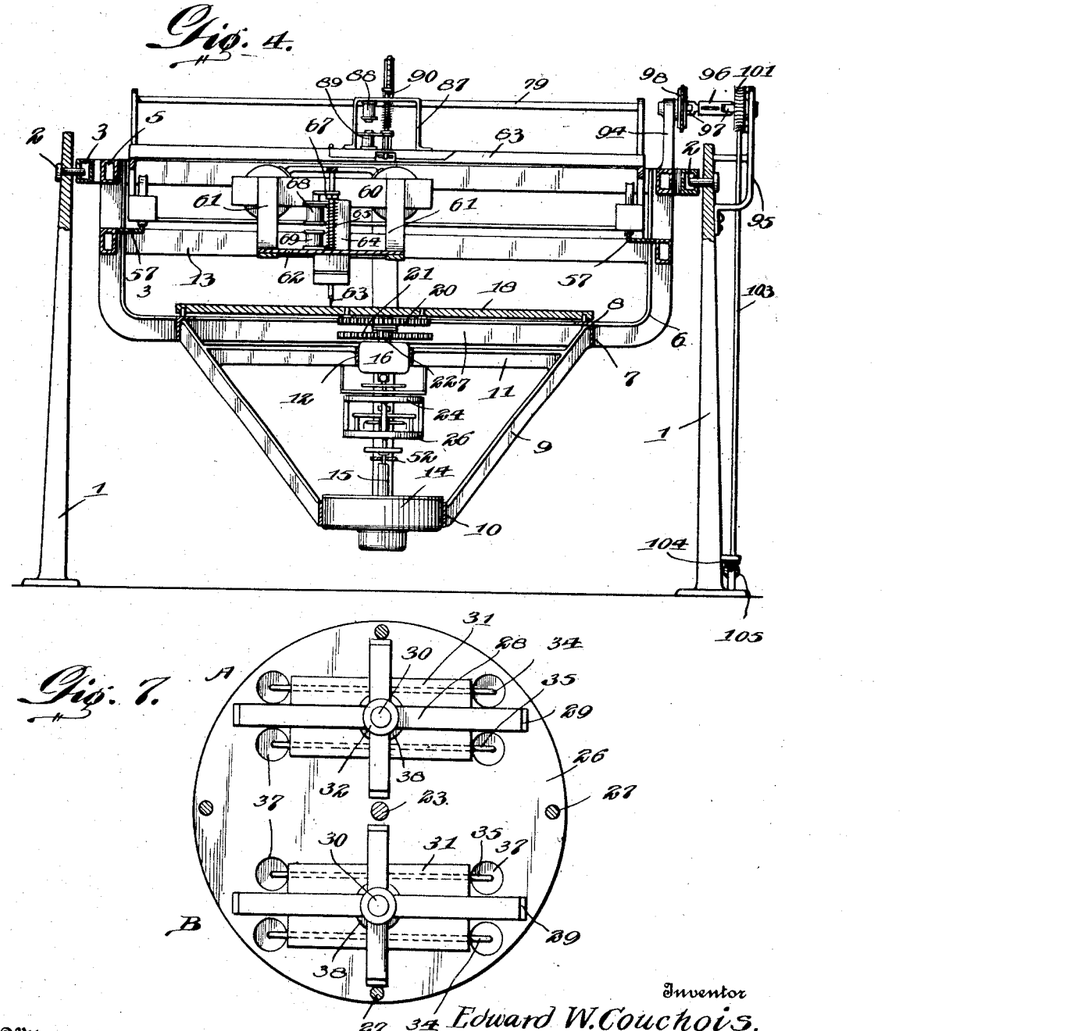
Fig. 4 is a cross sectional view on the line 4—4 of Fig. 1.
Fig. 7 is a horizontal sectional view on the line 7—7 of Fig. 6.
Figure 5:
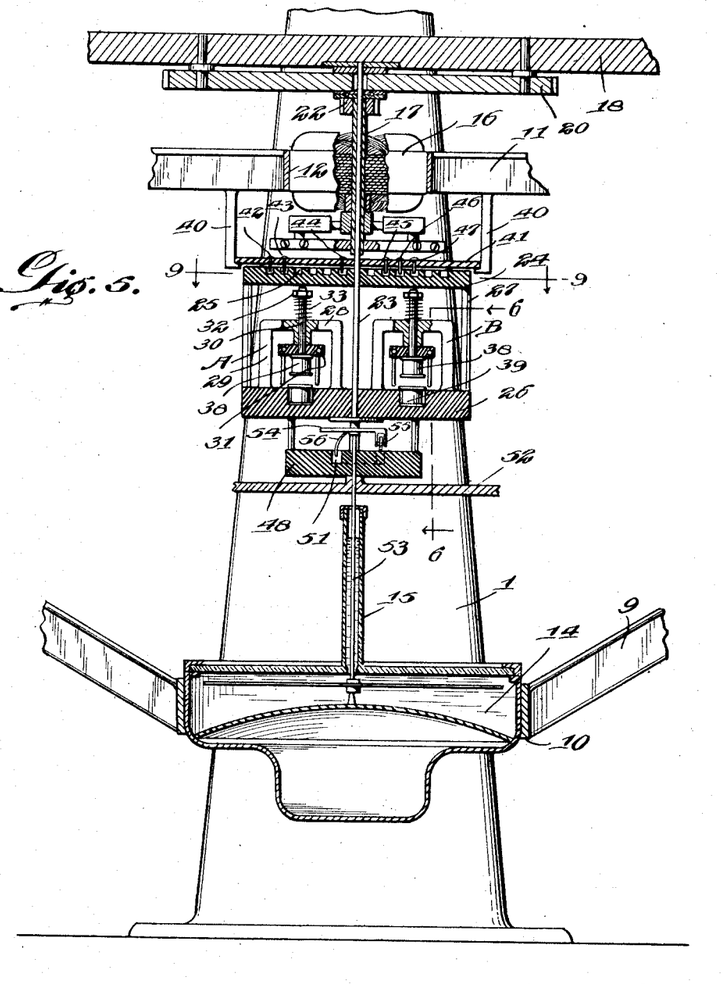
Fig. 5 is an enlarged fragmentary vertical sectional view through the apparatus.
Figure 6:
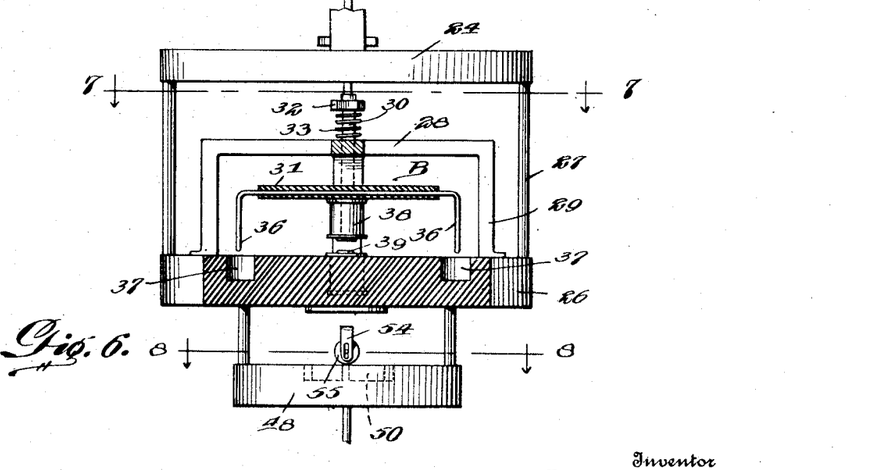
Fig. 6 is an enlarged sectional view on the line 6—6 of Fig. 5.
Figure 8:
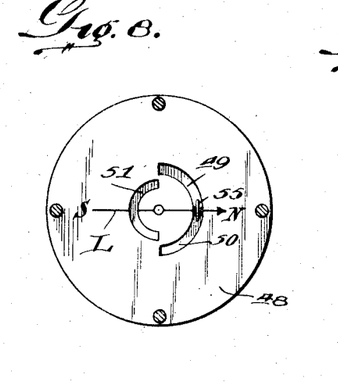
Fig. 8 is a similar view on the line 8—8 of Fig. 6.
Figure 9:
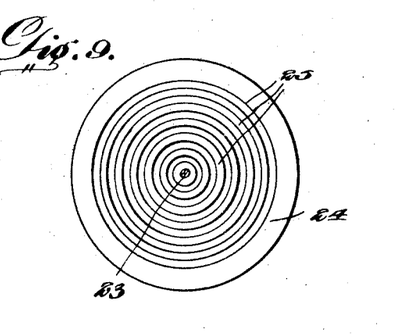
Fig. 9 is a top plan view of one of the contact plates, taken on the line 9—9 of Fig. 5.

Formed in the upper surface of the turn table 18 or inscribed thereon is a diametrical line D (see Fig. 1) arranged in plane extending through the space between the inner ends of the channels 49 and 50 in the block 48 of the compass controlled switch (see L in Fig. 8), and the end of this line that is near such space is marked N or "North", and placed upon this turn table is a chart having meridian lines and other data necessary to navigation inscribed thereon. The meridian lines of this chart lie parallel with the "North" and "South" line D on the turn table.

In practice, as long as the ship is traveling on a straight course, the motor 16, the magnets 88 and 89, and the magnets 68 and 69 are deënergized, the small carriage locked to the large carriage, and the large carriage driven from the propeller to trace the course across the chart on the turn table, this course being traced to scale owing to the reduction gear between the propeller and the large carriage. When, however, the ship turns from the straight course in one direction or the other, the arm 54 remains stationary with the compass needle, while the remaining part of the apparatus turns with the ship, and upon the turning of the block 48 the roller 55 engages in one or the other of the channels 49, 50 in accordance with the turning of the vessel, thereby closing the circuit to the corresponding reversing switch A or B. When the particular reversing switch is closed, current flows from the storage battery 125 through the reversing switch to the motor 16, thereby revolving the turn table to set the latter to a position corresponding to the new position of the compass needle. Simultaneously with the energization of the motor 16, current flows through the magnets 88 and 89 thereby elevating the latch 90 against the action of the spring 93 to disconnect the large carriage from the tape 81. Current also flows through the magnets 68 and 69 with the effect of disengaging the brake shoes 76 from the wheels of the small carriage and engaging the prongs 66 of the dog 65 with the turn table, thereby locking both carriages so that they may follow the turn table in the rotation of the latter under the action of the motor. This condition exists as long as the ship is turning; but when the turning ceases and the ship is straightened out on its new course, the rotation of the table 18 turns the block 48 under the contact roller 55 to move the latter out of the channel and again onto the portion of the block between the channels 49 and 50, thereby deënergizing the motor and the magnets so that the carriages may be again moved across the table and the scriber may trace the further course of the vessel on the chart.

While I have herein shown and described the preferred form of my invention by way of illustration, I wish it to be understood that I do not limit or confine myself to the precise details of construction herein described and delineated, as modification and variation may be made within the scope of the claims and without departing from the spirit of the invention.

I claim:—

1. In ships' navigating apparatus, a compass, a chart table mounted for rotation, a motor for rotating said chart table in one direction or the other and under the control of said compass, a carriage above said chart table and mounted upon a support fixed to the ship and adapted for movement over the chart table, a tape—the movement of which is controlled by the magnitude of the speed of the ship—a latch on the carriage engaging said tape, for operating said carriage, a second carriage mounted upon the first carriage and adapted to traverse the latter in a direction at right angles to the travel of the first carriage, a scribing tool carried by the second named carriage to mark said chart table, means for unlatching said first carriage from the tape in the turning of the ship, and means for locking the second named carriage to said chart table in the turning of the ship whereby both of said carriages may be moved by said chart table in the rotation of the chart table under the action of said motor.

2. In ships' navigating apparatus, a compass, a chart table, a motor for rotating said chart table in one direction or the other and under the control of said compass, a carriage mounted upon a support fixed to the ship and adapted for movement over the chart table, means controlled by the speed of the ship for operating said carriage, a second carriage mounted upon the first carriage and adapted to traverse the latter in a direction at right angles to the travel of the first carriage, a scribing tool carried by the second named carriage to mark said chart table, means for disconnecting said first carriage from the driving means thereof in the turning of the ship, a dog mounted on the second named carriage to said chart table in the turning of the ship whereby both of said carriages may be moved by said chart table in the rotation of the chart table under the action of said motor, and a brake holding the second named carriage normally against movement on the first mentioned carriage and operable from said last named means to release said second named carriage.

3. In ships' navigating apparatus, a compass, a chart table mounted for rotation, an electric motor for rotating said chart table in one direction or the other, reversing switches controlling the operating of said motor, means for operating said reversing switches selectively and under the control of said compass, scribing mechanism coöperating with said chart table and movable over the latter, propeller-actuated means for advancing said scribing mechanism in accordance with the speed of the ship, and means for locking the scribing mechanism to the table during the turning movement of the latter.

4. In ships' navigating apparatus, a compass, a chart table, a motor for rotating said chart table in one direction or the other and under the control of said compass, a carriage adapted for movement over the chart table, means controlled by the speed of the ship for operating said carriage a second carriage mounted for movement on and in a direction at right angles to the travel of the first carriage, brake mechanism on said second carriage holding the latter normally on the first carriage, a scribing tool carried by the second carriage to mark said chart table, means for disconnecting said first carriage from the driving means thereof in the turning of the ship, a dog for locking said second named carriage to said chart table, a lever connecting the dog and brake, and means for actuating the lever to apply the dog and release said brake mechanism in the turning of the ship whereby both of said carriages may be moved by said chart table in the rotation of said chart table under the action of the motor.

5. In a ship's navigating apparatus, a frame, parallel track rails carried by the frame, a ring also carried by and below this frame, a chart table rotatably mounted on the ring, a compass, and means for setting the table by the movements of the compass; combined with a large carriage movable on said rails by the speed of the ship and itself having a pair of rails at right angles thereto, a small carriage movable on the last named rails, scribing mechanism carried by the small carriage and co-acting with said table, means for moving the small carriage by the turning of the ship, means for locking the carriages together while the ship is on a straight forward course, and means for unlocking them from each other and locking the small carriage to said table while the ship is turning.

In testimony whereof I affix my signature.

EDWARD W. COUCHOIS.

Copies of this patent may be obtained for five cents each, by addressing the "Commissioner of Patents, Washington, D. C."